United States Patent [19]

Naito et al.

[11] 4,124,812
[45] Nov. 7, 1978

[54] BRAKING CONTROL APPARATUS FOR AN ELECTRIC MOTOR OPERATED VEHICLE

[75] Inventors: Shotaro Naito; Masahiko Ibamoto; Hisakatsu Kiwaki; Yoshimitsu Onoda, all of Katsuta, Japan

[73] Assignee: Hitachi, Ltd., Japan

[21] Appl. No.: 742,263

[22] Filed: Nov. 16, 1976

[30] Foreign Application Priority Data

Nov. 19, 1975 [JP] Japan .................. 50-138099

[51] Int. Cl.² .................. H02P 3/10; H02P 3/14
[52] U.S. Cl. .................. 318/371; 318/373; 318/376; 318/367
[58] Field of Search .............. 318/367, 369, 370, 371, 318/373, 376

[56] References Cited

U.S. PATENT DOCUMENTS

| | | | |
|---|---|---|---|
| 2,243,590 | 5/1941 | Wendelburg | 318/371 |
| 2,275,118 | 3/1942 | Wendelburg | 318/371 |
| 2,505,281 | 4/1950 | Elwood | 318/371 |
| 2,539,191 | 1/1951 | Hoffmann | 318/371 |
| 2,926,759 | 3/1960 | Lichtenfels | 318/371 |
| 3,694,721 | 9/1972 | Henry | 318/373 |
| 3,710,216 | 1/1973 | Smith | 318/373 |
| 3,828,235 | 8/1974 | Price | 318/373 |
| 3,944,899 | 3/1976 | Wright | 318/369 |

FOREIGN PATENT DOCUMENTS 792,894  8/1968  Canada .................. 318/373

*Primary Examiner*—Robert K. Schaefer
*Assistant Examiner*—William L. Feeney
*Attorney, Agent, or Firm*—Craig & Antonelli

[57] ABSTRACT

In cases of subjecting an electric motor operated vehicle to electric braking, regenerative braking is performed during the first stage of the braking operation thereby supplying the armature current to the battery as a load, and a plugging operation is performed during the last stage thereof to complete the braking operation, whereby the efficiency of operation is enhanced by conserving the armature current to extend the traveling distance of the vehicle per charge of the vehicle battery, and the generation of excessive heat in the motor is suppressed.

11 Claims, 4 Drawing Figures

F I G. 2
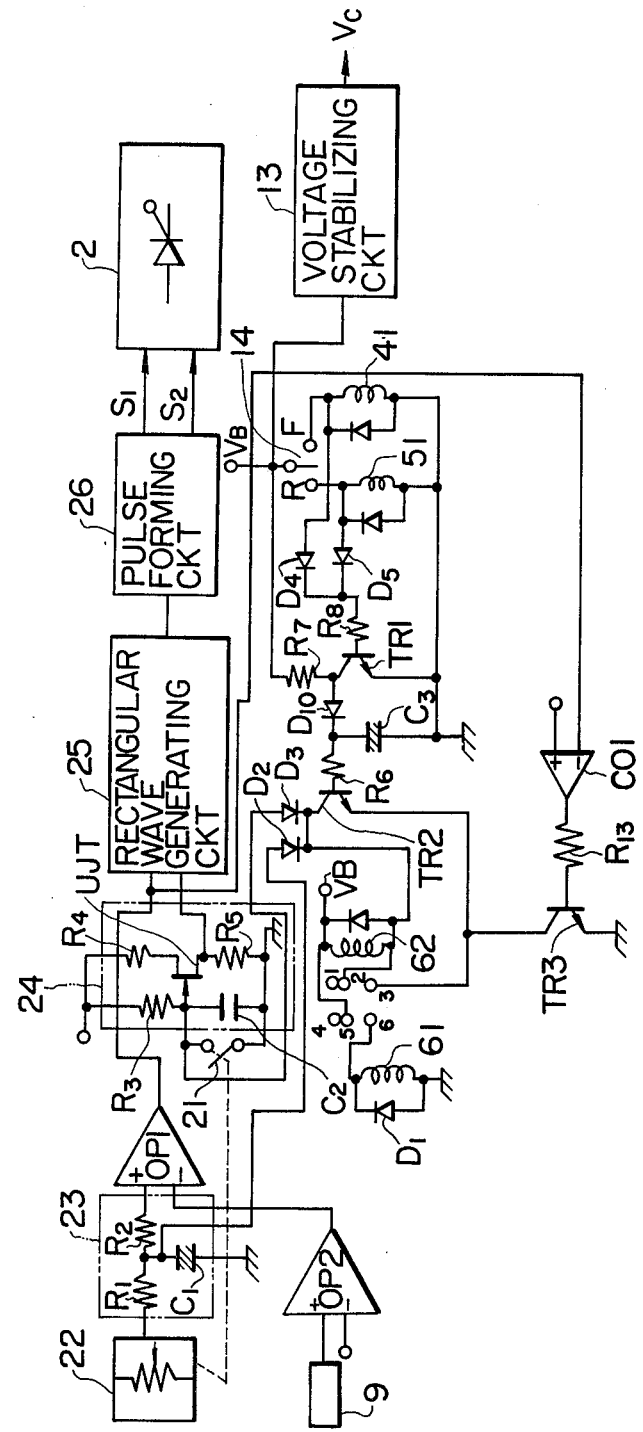

BRAKING CONTROL APPARATUS FOR AN ELECTRIC MOTOR OPERATED VEHICLE

BACKGROUND OF THE INVENTION

This invention relates to a braking control apparatus for an electric motor operated vehicle, and more particularly, to a braking control apparatus which is suitable for use in a battery operated fork lift.

In the battery operated fork lift, it has hitherto been the general practice to utilize a plugging operation as the means for electric braking. The reason for adoption of this system is that in order to perform such electric braking, it is not especially necessary to change the connection of the main circuit, and that upon completion of electric braking, it is possible to directly and continuously shift to operation in the reverse direction.

The fork lift frequently repeats forward and backward movements in the process of loading and unloading of goods. In particular, it is common pratice during the operation of such a vehicle that, while turning back the steering wheel in order to change the direction of vehicle movement, shifting from backward movement to forward movement is simultaneously performed. The plugging operation is an electric braking operation which is well adapted for this type of running operation, which is peculiar to the fork lift. The system, however, is inferior in efficiency because all the braking energy is merely dissipated as heat generated in the internal resistance of the armature by current flowing through a plugging diode and no regenerative current can be caused to flow to the battery as a result of the electromotive force induced in the armature.

Further, there are the problems of the deterioration of insulation, the cooling, etc., ascribable to the generation of heat in the armature. Accordingly, the motor inevitably becomes expensive to manufacture. For such reasons, the plugging operation is not employed in the braking of railway vehicles, electromobiles, etc., the regenerative braking system being exclusively adopted for such vehicles.

The regenerative braking system, however, requires a large number of contactors or thyristors (silicon controlled rectifiers) for the change-over between the powering phase and the regeneration braking phase, and therefore, this type of system also is very expensive. In addition, a regenerative braking system is unsuitable for the running characteristic of a fork lift since the forward power running cannot be initiated continuously from backward movement. Even if the main circuit is quickly switched when the powering in the reverse direction is to be shifted to upon completion of a braking period, a shock will arise when the switching timing is early. The main circuit must therefore be switched when the revolution of the motor has just stopped. It is apparent that the attachment of such a control device will render the system still more expensive.

SUMMARY OF THE INVENTION

An object of this invention is to provide an inexpensive and highly efficient braking control apparatus for a battery operated fork lift, etc., by executing the controls of regeneration, plugging and powering with a simple main circuit.

This invention consists in adopting the regenerative braking at the first stage of braking and the plugging operation at the last stage thereof, whereby the efficiency is enhanced and the generation of heat in the motor is suppressed, and moreover, a continuous shift to a reverse operation is made possible.

BRIEF DESCRIPTION OF THE DRAWING

FIG. 2 is a schematic circuit diagram which shows the essential portions of the control apparatus of the embodiment shown in FIG. 1;

DESCRIPTION OF THE PREFERRED EMBODIMENTS

Figure 1:
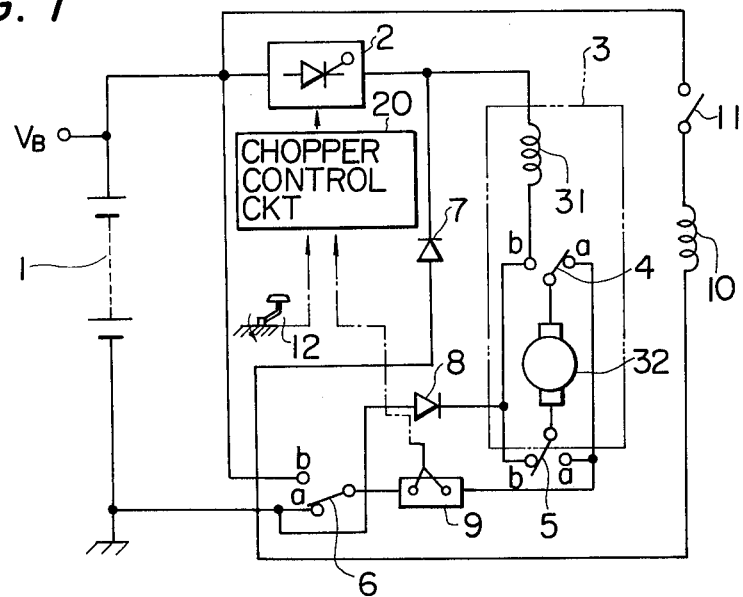
FIG. 1 is a schematic circuit diagram which shows the main circuit configuration of a braking control apparatus for an electric motor operated vehicle embodying this invention.

Hereunder, the embodiments of this invention will be described with reference to the drawing.

FIG. 1 illustrates a main circuit of a braking control apparatus. Voltage from a battery 1 is controlled by a chopping circuit 2 and the chopped d.c. voltage is applied to a series circuit comprising a field coil 31 and an armature 32 of an electric motor 3. Numeral 4 designates a forward contactor, and numeral 5 a backward contactor. At the time of stopping of the electric motor operated vehicle, the contactor 4 is in the illustrated position in contact with terminal $a$ thereof, while the contactor 5 is in a position opposite to the illustrated one being also in contact with the terminal $a$ thereof so that the armature 32 of the electric motor 3 is short circuited. Shown at 6 is a regeneration contactor, which assumes the illustrated position in contact with terminal $a$ thereof during the powering phase of operation.

Numeral 8 denotes a plugging diode through which an armature current flows during the reversal control phase of operation, numeral 9 designates a motor current detector, numeral 10 denotes a shunt field coil, and numeral 11 identifies a relay for turning "on" and "off" the shunt field current. Shown at 20 is a chopper control circuit, which receives a signal corresponding to the amount of actuation of an accelerator pedal 12 and the detection value of the current detector 9 as inputs.

During the regeneration phase of operation in response to the vehicle direction change-over command of the operator, the regeneration contactor 6 is switched to the position opposite to the illustrated one into contact with terminal $b$ thereof. In case of performing regenerative braking during vehicle forward movement, i.e., while the vehicle is still moving forward but after the contactors 4 and 5 are switched for backward movement, the forward contactor 4 and the backward contactor 5 assume the illustrated positions in contact with terminals $a$ and $b$ thereof, respectively. The armature 32 and the series field coil 31 at that time are short-circuited by the chopping circuit 2, and a shortcircuit current flows to turn "off" the chopping circuit 2. With the chopping circuit non-conductive, the field coil 31 and the armature 32 are connected in parallel across the battery 1. In this regard one path extends from VB through switch 11, shunt field coil 10, free wheel diode 7, field coil 31, and plugging diode 8 to ground. The other parallel path extends from VB through regeneration contactor 6, current detector 9, contactor 4, armature 32, and plugging diode 8 to ground. Thus, the voltage induced in the inductance of the series field coil 31 is superposed on the armature voltage, and a regenerative current flows through the armature 32 to the battery 1.

Referring now to FIG. 2, numeral 21 represents an accelerator switch and numeral 22 represents a potentiometer, both of which components are interlocked with the accelerator pedal 12. Numeral 23 indicates a delay circuit, which is composed of resistances $R_1$ and $R_2$ and a capacitor $C_1$. An oscillator 24 is composed of a unijunction transistor UJT, resistances $R_3$, $R_4$ and $R_5$ and a capacitor $C_2$. A rectangular wave generating circuit 25, constructed of a monostable multivibrator, is connected to the output of oscillator 24. A pulse forming circuit 26 differentiates the rise and fall of the output waveform of the rectangular wave generating circuit 25. Output pulses $S_1$ and $S_2$ thus formed are impressed on the chopper 2 and control the "on" and "off" states of the chopper, and therefore, the duty cycle thereof. Numeral 41 designates a forward contactor coil, numeral 51 designates a backward contactor coil, and numerals 61 and 62 designate regeneration contactor coils. Numeral 13 denotes a voltage stabilizing circuit, and numeral 14 designates a forward—backward change-over switch.

For forward movement, the forward—backward change-over switch 14 is connected to a terminal F with the result that the forward contactor coil 41 is energized, whereas the backward contactor coil 51 is in the deenergized state. Therefore, the forward contactor 4 and the backward contactor 5 assume positions opposite to those shown in FIG. 1. Since the accelerator pedal 12 is depressed at this time, the accelerator switch 21 is in the "on" state, i.e., closed. The oscillator 24 therefore operates to drive the rectangular wave generating circuit 25. The pulses $S_1$ and $S_2$ subjected to waveform shaping are impressed on the thyristor chopper 2 from the pulse shaping circuit 26 and control the "on" and "off" conditions of the thyristor chopper.

An output responsive to angle of depression of the accelerator pedal is applied from the accelerator potentiometer 22 via the delay circuit 23 to one input of an operational amplifier OP1. On the other hand, a current command is applied to the other input of the operational amplifier OP1 from the current detector 9 through an operational amplifier OP2. The output of the operational amplifier OP1 determines the metastable time of the monostable multivibrator of the pulse generating circuit 25, and accordingly determines the duty factor of the chopper 2.

When, under such state, the forward—backward change-over switch 14 is brought into a backward or rearward state into contact with terminal R in order to change-over the forward and backward movements of the vehicle, the forward contactor exciting coil 41 is deenergized, whereas the backward contactor exciting coil 51 is energized, so that the forward contactor 4 and the backward contactor 5 are switched to the state illustrated in FIG. 1. During a certain short period of time in the process of the change-over, no base current flows through the transistor $TR_1$ via diode $D_4$ or diode $D_5$ and resistance $R_8$, and the transistor $TR_1$ therefore is held in the "off" state. In consequence, transistor $TR_2$ is held in the "on" state for a fixed period of time after a certain time delay provided by resistance $R_7$, diode $D_{10}$, capacitor $C_3$ and resistance $R_6$. At this time, the oscillation of the unijunction transistor UJT of the oscillator 24 is stopped by the voltage applied through diode $D_3$. At the same time, the voltage applied to the operational amplifier OP1 through diode $D_2$ becomes small, so that the duty factor of the chopper 2 is minimized. Simultaneously therewith, the output of the operational amplifier OP1 lowers, so that the output of a comparator CO1 connected to the output of the amplifier OP1 becomes "1" to turn "on" transistor $TR_3$. With the transistor $TR_3$ conductive, the relay 62 is energized from battery VB through transistors $TR_2$ and $TR_3$, the contactor coil 61 is also energized with energization of relay coil 62, and the regeneration contactor 6 assumes the polarity opposite to that shown in FIG. 1. When the transistor $TR_2$ is switched to the "off" state after a fixed time with conduction of transistor $TR_1$, the unijunction transistor UJT of the oscillator 24 starts oscillating. A motor short-circuit current responsive to the angle of depression of the accelerator pedal 12 flows through the chopper 2, and the regenerative current flows to the battery 1 as stated previously. Thus, the regenerative braking operation is carried out.

Even after the forward—backward change-over switch 14 has been thrown to the position F or R, the relay 62 has a self-maintaining circuit formed by contacts two and three, and the powering—regeneration change-over contactor 61 is held in the energized state through conductive transistor $TR_3$.

When the speed of revolution of the electric motor lowers due to the regenerative braking, the duty factor of the chopper 2 becomes large. This is because, when the speed of revolution of the motor lowers, the duty factor of the chopper increases in order to cause a predetermined armature current to flow.

In the case where the duty factor exceeds a certain value, the output of the comparator CO1 becomes "0" to turn "off" the transistor $TR_3$ through resistance $R_{13}$. When the transistor $TR_3$ becomes non-conductive, the relay 62 is deenergized, and the regeneration contactor 6 returns to the state shown in FIG. 1. Thus, plugging or reversal braking is executed, and the car is changed-over from the state of forward movement to the state of backward movement.

Various systems for changing-over the braking modes are possible. First, the speed of revolution of the motor (or the speed of the vehicle) may be detected. When the speed has become lower than a predetermined speed, the contactor 6 is changed-over from the regenerative braking position to the plugging position. The change-over is effected by an output a velocity detector such as a velocity dynamo.

Figure 3:
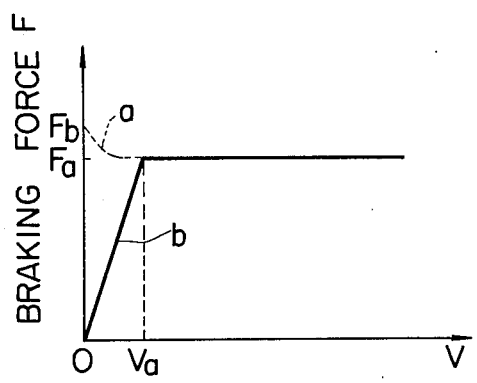
FIG. 3 is a characteristic diagram which shows operating characteristics of the present invention.

FIG. 3 illustrates the relationship between the vehicle velocity $v$ and the braking force F. As the vehicle velocity $v$ increases, the regenerative braking force F increases, as indicated by solid line $b$. In actuality, when a fixed vehicle velocity $v_a$ is exceeded, a current limitation is applied, and the braking force is suppressed to a fixed value $F_a$. On the other hand, the plugging braking force exhibits the maximum value $F_b$ at the minimum vehicle velocity, as indicated by the broken line $a$. The plugging braking force decreases with an increase of the vehicle velocity, and can be so set as to become the same magnitude as in the case of the regenerative braking in the vicinity of the vehicle velocity $v_a$. Accordingly, the braking modes may be changed-over in the vicinity of the vehicle velocity $v_a$.

There also may be considered a control system wherein, whenever the braking operation is initiated by the driver, regenerative braking is at once executed, and a control system wherein when the velocity during the braking operation is below a predetermined value, the plugging operation is directly carried out without performing regenerative braking. The two control systems have no substantial difference in braking effect, but they do differ in circuit arrangement. Either may be selected as may be needed or desired.

Secondly, the armature current during regenerative braking may be detected and the contactor 6 changed over when the armature current drops below a predetermined value. This system for changing-over the braking modes is based on the facts as described below. Even during regeneration, the gate signal circuit 20 performs constant current control (of course, the limited current value differs from that during the powering phase). Where the speed of revolution of the motor is low, the predetermined armature current cannot be permitted to flow even when the duty factor of the chopper 2 to 100 percent. Therefore, this condition is detected to effect the change-over to the plugging phase of operation.

Figure 4:
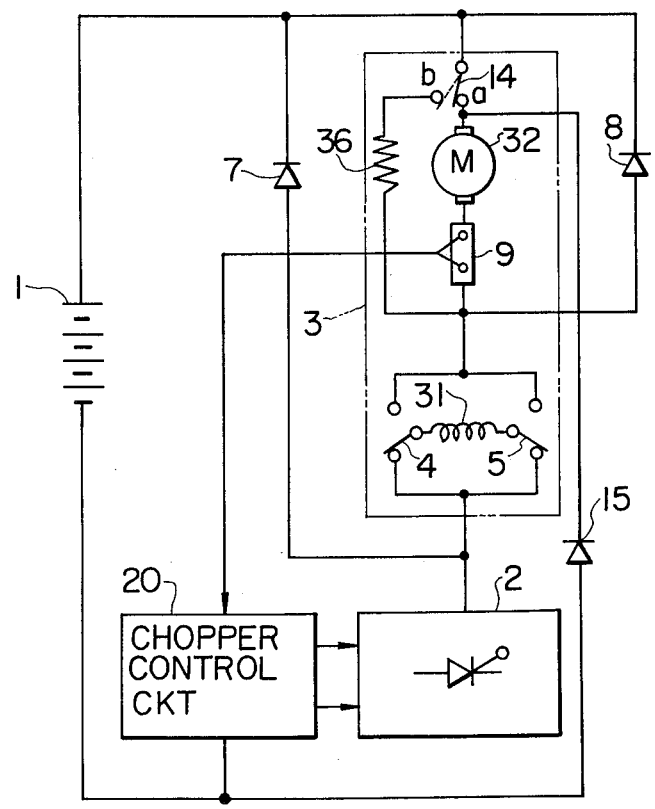
FIG. 4 is a schematic circuit diagram which shows a main circuit of another embodiment of this invention.

Another embodiment of this invention is shown in FIG. 4. Numeral 14 designates a powering—regeneration changing-over contactor, numeral 15 designates a counter current blocking diode, and numeral 36 designates a preliminary excitation resistance.

When the contactor 14 is not operated, it contacts the terminal a as illustrated in the figure, and a powering and plugging circuit is formed. The preliminary excitation resistance 36 is perfectly disconnected, and the counter current blocking diode 15 is directly connected to the battery 1 in the reverse direction and in parallel therewith, so that it is normally reverse-biased to permit no current to flow therethrough. Accordingly, the powering and the plugging operations can be executed in this state.

Now, consider a state illustrated by the broken line position of contactor 14 in FIG. 4 in which the contactor 14 is operated. The resulting circuit is a well known, series regenerative braking circuit with a bypass diode. However, even when only the contactor 14 is changed-over from the powering state, regenerative operation is not established in that condition because the direction of the electromotive force is reversed for such operation. In order to effect regenerative operation, it is necessary to switch the contactor 14 and also to switch the forward contactor 4 and backward contactor 5 so as to reverse the direction of the field system.

Description will now be made of a method of controlling the above circuit. When the forward contactor 4 is operated under the state in which the fork lift is stationary, the main circuit is closed. When the duty factor of the chopper 2 is gradually increased, a motor current flows and the fork lift moves forward. At this time, a current flows through the field coil 31 from the left towards the right.

During the forward running, the chopper 2 is turned "off" to switch the contactor 4 "off", and the contactors 5 and 14 are operated to operate the chopper 2 again. Then, when the chopper 2 is rendered conductive, a preliminary excitation current flows from the battery 1 through the contactor 14, preliminary excitation resistance 36, contactor 5, field coil 31, normally-closed contact of the contactor 4, and chopper 2, and a magnetic flux is generated in the field coil 31. A field current at this time flows from the right towards the left in contrast to that during the powering phase. As a result of the preliminary excitation, the motor functions as a dynamo and produces a downward electromotive force in the armature 32. Therefore, the field coil 31 is excited increasingly by the electromotive force, and a circulating current flows which passes through the armature 32, contactor 5, field coil 31, normally-closed contact of the contactor 4, and chopper 2. When the circulating current has reached a certain value, the chopper 2 is turned "off". Then, energies accumulated in the inductances of the armature 32 and the field coil 31 effect the regeneration of power for the battery 1 through the free wheel diode 7.

In this manner, while the chopper 2 is conductive, the circulating current flows through the armature 32, field coil 31 and chopper 2 to accumulate the energies, and when the chopper 2 turns "off", the energies are regenerated for the battery 1. By repeating such operation, the regenerative braking force is obtained. In a region in which the number of revolutions is large, the electromotive force generated in the armature 32 will sometimes threaten to become higher than the battery voltage. In such case, however, a current immediately flows to the battery via the plugging diode 8, and hence, the electromotive force generated in the armature 32 is clamped to the battery voltage. Accordingly, there is not the danger that the circulating current will diverge. Such circuit can stably effect the regenerative control in a wide region of the numbers of revolutions.

When the velocity lowers as the result of the regenerative braking, the efficiency of regeneration lowers. At that time, the chopper 2 is at once turned "off", and only the contactor 14 is restored to operate the chopper again. Then, the plugging operation is initiated. Needless to say, if the chopper operation is continued, the fork lift shifts to the backward powering immediately after it stops.

In this manner, the regenerative braking is executed at first when the powering is switched to the electric braking, it is switched to the plugging operation when the speed lowers, and the reversal running can be continuously shifted to in that condition. This is extraordinarily suitable for the operation of the fork lift.

With such measure, it is possible to automatically stop the regenerative braking and change it to the plugging operation at the timing at which the efficiency of regeneration becomes maximum. The traveling distance of the vehicle per battery charge can thus be extended, so that the activity rate of the fork lift can be enhanced.

In the case of the plugging operation, power is supplied from the battery even during braking, and the power generation energy produced in the armature 32 is mostly dissipated as heat in the armature 32, whereas in case of the regenerative braking, the power generation energy is fed back to the battery 1, so that the generation of heat in the armature 32 is small, which relieves the problems of the deterioration of insulation of the motor, the cooling, etc., and which makes it possible to lower the production cost of the motor.

What is claimed is:

1. In an electric motive power system including an electric driving motor supplied with power from a battery through a chopper and drive direction switching means for selectively switching the connection of said battery to said electric driving motor to effect forward and backward operation thereof, a braking control apparatus comprising regeneration switch means for switching connection of said battery to said electric drive motor to effect regenerative braking of said motor, detecting means for sensing a predetermined operating condition of said electric driving motor, and control means responsive to said detecting means for operating said regeneration switch means at the time of operation of said drive direction switching means to effect regenerative braking prior to sensing of said predetermined operating condition by said detecting means and for releasing said regeneration switch means in response to said detecting means to thereafter provide plugging braking.

2. The braking control apparatus as defined in claim 1 wherein said motive power system further includes chopper control means for selectively controlling the duty factor of said chopper, and wherein said detecting means comprises means for detecting a predetermined value of the duty factor of said chopper.

3. The braking control apparatus as defined in claim 1 wherein said detecting means comprises means for detecting a predetermined average value of the armature current of said motor.

4. The braking control apparatus as defined in claim 1 wherein said detecting means comprises means for detecting a predetermined rotational speed of said motor.

5. The braking control apparatus as defined in claim 1 wherein said motor includes a field winding and an armature winding and said direction switching means is connected to said field winding and said armature winding to form a series circuit in which the polarity of connection of the elements thereof is selectively reversible.

6. The braking control apparatus as defined in claim 5 wherein said regeneration switch means includes a plugging diode connected between one side of said battery and the point of connection of the elements of said series circuit, and a switch arrangement responsive to said control means for selectively connecting the respective ends of said series circuit to the other side of said battery.

7. The braking control apparatus as defined in claim 6 wherein one end of said series circuit is connected to said other side of said battery through a free wheel diode.

8. The braking control apparatus as defined in claim 5 wherein said regeneration switch means includes a plugging diode connected between one side of said battery and the point of connection of the element of said series circuit, and a switch arrangement responsive to said control means for selectively connecting one end of said series circuit to said one end of said battery and the other end of said series circuit to the other end of said battery.

9. The braking control apparatus as defined in claim 7 wherein the respective ends of said series circuit are connected to said battery through respective diodes.

10. In a braking control apparatus for an electric vehicle including a d.c. electric motor for driving the vehicle, a battery supplying the d.c. motor with electric power, a chopper for controlling the d.c. motor, drive direction switching means for selectively switching the connection of the battery to the d.c. motor to effect forward and backward operation thereof, and a current detector for detecting an armature current of the d.c. motor, the improvement comprising:

means for generating a reference of the braking force;
regeneration switch means for switching connection of the battery to the d.c motor to effect regenerative braking of the d.c. motor;
a chopper control means for controlling a duty factor of the chopper in accordance with the comparison between the braking force reference and the output of the current detector so that the regenerative braking force produced by the d.c. motor is kept at a certain constant value;
detecting means for sensing a predetermined operating condition of the d.c. motor, the predetermined operating condition being the operating condition under the minimum rotating speed of the d.c. motor above which the regenerative braking of the certain constant value of braking force is actuated; and
control means responsive to the detecting means for operating the regenerative switch means at the time of operation of said drive direction switching means to effect regenerative braking prior to sensing of the predetermined operating condition by the detecting means and for releasing the regeneration switch means in response to the detecting means to thereafter provide plugging braking, wherein the braking force of the regenerative braking and the plugging braking is kept equal to the certain constant value at the time of transfer from the regenerative braking to the plugging braking.

11. The braking control apparatus as defined in claim 10, wherein said detecting means comprises means for detecting a predetermined value of the duty factor of said chopper under the condition of regenerative braking.

* * * * *